(12) United States Patent
Matsushita et al.

(10) Patent No.: US 9,567,146 B2
(45) Date of Patent: Feb. 14, 2017

(54) PROCESS FOR PRODUCING OXYGEN ABSORBING AGENT

(71) Applicant: MITSUBISHI GAS CHEMICAL COMPANY, INC., Tokyo (JP)

(72) Inventors: Natsuko Matsushita, Tokyo (JP); Emi Ishihara, Tokyo (JP); Hirokazu Tanaka, Tokyo (JP); Tatsuo Iwai, Tokyo (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 0 days.

(21) Appl. No.: 14/418,655

(22) PCT Filed: Aug. 1, 2013

(86) PCT No.: PCT/JP2013/070900
§ 371 (c)(1),
(2) Date: Jan. 30, 2015

(87) PCT Pub. No.: WO2014/021430
PCT Pub. Date: Feb. 6, 2014

(65) Prior Publication Data
US 2015/0191292 A1    Jul. 9, 2015

(30) Foreign Application Priority Data
Aug. 2, 2012    (JP) ................. 2012-172199

(51) Int. Cl.
| | | |
|---|---|---|
| *B65D 81/26* | (2006.01) | |
| *A23L 3/3436* | (2006.01) | |
| *B22F 1/02* | (2006.01) | |
| *C08K 3/08* | (2006.01) | |
| *B01D 53/02* | (2006.01) | |
| *B01D 53/82* | (2006.01) | |
| *B01D 53/86* | (2006.01) | |
| *B22F 1/00* | (2006.01) | |
| *B01J 20/26* | (2006.01) | |
| *B01J 20/28* | (2006.01) | |
| *B01J 20/30* | (2006.01) | |
| *B01J 20/32* | (2006.01) | |
| *B01D 53/14* | (2006.01) | |
| *C08K 3/10* | (2006.01) | |
| *B01J 20/02* | (2006.01) | |
| *C22C 1/02* | (2006.01) | |
| *C22C 33/04* | (2006.01) | |
| *C22C 38/06* | (2006.01) | |
(Continued)

(52) U.S. Cl.
CPC ........... *B65D 81/266* (2013.01); *A23L 3/3436* (2013.01); *B01D 53/02* (2013.01); *B01D 53/14* (2013.01); *B01D 53/82* (2013.01); *B01D 53/8671* (2013.01); *B01J 20/0225* (2013.01); *B01J 20/0229* (2013.01); *B01J 20/0248* (2013.01); *B01J 20/261* (2013.01); *B01J 20/2805* (2013.01); *B01J 20/28026* (2013.01); *B01J 20/28033* (2013.01); *B01J 20/28059* (2013.01); *B01J 20/3014* (2013.01); *B01J 20/3085* (2013.01); *B01J 20/3204* (2013.01); *B01J 20/3236* (2013.01); *B22F 1/00* (2013.01); *B22F 1/0011* (2013.01); *B22F 1/0088* (2013.01); *B22F 1/02* (2013.01); *C08K 3/08* (2013.01); *C08K 3/10* (2013.01); *C22C 1/02* (2013.01); *C22C 33/04* (2013.01); *C22C 38/06* (2013.01); *B01D 2257/104* (2013.01); *B01J 2220/46* (2013.01); *B22F 9/04* (2013.01); *B22F 2003/1014* (2013.01); *B22F 2998/10* (2013.01); *B22F 2999/00* (2013.01)

(58) Field of Classification Search
CPC ............................. A23L 3/3436; C09K 15/02
See application file for complete search history.

(56) References Cited

U.S. PATENT DOCUMENTS

| | | | |
|---|---|---|---|
| 4,366,179 A | | 12/1982 | Nawata et al. |
| 4,406,813 A | * | 9/1983 | Fujishima ............... C09K 15/02 |
| | | | 210/750 |

(Continued)

FOREIGN PATENT DOCUMENTS

| | | |
|---|---|---|
| CN | 101128526 | 2/2008 |
| CN | 101304806 | 11/2008 |
| JP | 56-130222 | 10/1981 |
| JP | 56-133027 | 10/1981 |
| JP | 60-087850 | 5/1985 |
| JP | 62-277148 | 12/1987 |
| JP | 5-023597 | 2/1993 |
| JP | 9-253481 | 9/1997 |
| JP | 2003-225560 | 8/2003 |
| JP | 2004-201640 | 7/2004 |
| JP | 2005-104064 | 4/2005 |
| JP | 2007-185653 | 7/2007 |

(Continued)

OTHER PUBLICATIONS

Search report from PCT/JP2013/070900, mail date is Oct. 8, 2013.
International Preliminary Report on Patentability issued in PCT/JP2013/070900.

(Continued)

*Primary Examiner* — Peter F Godenschwager
(74) *Attorney, Agent, or Firm* — Greenblum & Bernstein, P.L.C.

(57) ABSTRACT

A process for producing an oxygen absorbing agent includes treating an alloy with an aqueous solution of an acid or an alkali, the alloy including at least one transition metal selected from the group consisting of manganese, iron, platinum, and copper group metals and at least one metal selected from the group consisting of aluminum, zinc, tin, lead, magnesium, and silicon to elute and remove at least a part of the component; and subjecting the alloy obtained by removing at least a part of the component in the alloy to treatment with an aqueous solution of a salt of an inorganic acid or a salt of an organic acid that can form a salt with the transition metal as the component, to form a metal salt in at least a part of the surface of the alloy.

8 Claims, No Drawings

(51) Int. Cl.
  *B22F 9/04*   (2006.01)
  *B22F 3/10*   (2006.01)

(56) References Cited

U.S. PATENT DOCUMENTS

| | | | |
|---|---|---|---|
| 6,156,694 A * | 12/2000 | Harper | B01J 25/00 |
| | | | 502/301 |
| 2006/0192176 A1 | 8/2006 | Rollick et al. | |
| 2009/0095941 A1 | 4/2009 | Nakata et al. | |
| 2013/0209350 A1 | 8/2013 | Ishihara et al. | |

FOREIGN PATENT DOCUMENTS

| | | |
|---|---|---|
| TW | 201247307 | 12/2012 |
| WO | 2012/105457 | 8/2012 |

OTHER PUBLICATIONS

Extended European Search Report in respect to European Application No. 13825533.6, dated Feb. 29, 2016.
Zhao et al., "Selective catalytic hydroalkylation and deoxygenation of substituted phenols to bicycloalkanes", Journal of Catalysis, Academic Press, vol. 288, Jan. 10, 2012, pp. 92-103.

* cited by examiner

PROCESS FOR PRODUCING OXYGEN ABSORBING AGENT

TECHNICAL FIELD

The present invention relates to a process for producing an oxygen absorbing agent. More specifically, the present invention relates to a process for producing an oxygen absorbing agent that can suppress excessive heat generation under an atmospheric environment and can stably maintain an oxygen absorbing capability.

BACKGROUND ART

One of techniques for preserving foods, pharmaceutical products and the like is preservation utilizing oxygen absorbing agents (oxygen scavengers). Specifically, the preservation utilizing oxygen absorbing agents is a technique in which an oxygen scavenger capable of absorbing oxygen in atmosphere, together with an object, is placed within a hermetically sealable packaging body, and the inside of the hermetically sealable packaging body is brought to an oxygen-free state to prevent an oxidation-derived deterioration, a fungal deterioration, discoloration and the like of objects.

Oxygen scavengers formed of various inorganic materials and oxygen scavengers formed of various organic materials have hitherto been proposed for the removal of oxygen in atmosphere. Examples thereof include oxygen scavengers comprising inorganic main agents, for example, iron or other metal powders, sulfites, bisulfites, and dithionite, and oxygen scavengers comprising organic main agents, for example, L-ascorbic acid, erythorbic acid and salts thereof, saccharides such as glucose, and reducing polyhydric alcohols such as cathecol and pyrogallol.

These conventional oxygen scavengers, however, suffer from a problem that, in use, when a material that can supply water or moisture does not exist, an oxygen scavenging capability high enough to be used for practical use cannot be provided. Specifically, in conventional oxygen scavengers, an oxygen scavenging capability high enough to be used for practical use cannot be provided without mixing of the material with water or moisture retained thereon, for example, compounds containing water of crystallization, in use, or utilization of water vapor released from foods or the like to be preserved. Accordingly, difficulties have been encountered in applying conventional oxygen scavengers to pharmaceutical products or dried foods that should be used or preserved under drying conditions, or to storage of metal products that are weak against water or moisture without rusting.

Accordingly, oxygen absorbing agents that do not require moisture in oxygen absorption have been demanded in these applications. Oxygen absorbing agents reported as meeting this demand include, for example, oxygen scavengers comprising cerium oxide utilizing oxygen defects as a main agent (Japanese Patent Application Laid-Open No. 185653/2007), oxygen scavengers comprising titanium oxide containing oxygen defects as a main agent (Japanese Patent Application Laid-Open No. 104064/2005), oxygen scavengers comprising a metal subjected to hydrogen reduction as a main agent (Japanese Patent Application Laid-Open No. 277148/1987), and oxygen scavengers that utilize autoxidation of organic substances.

Among the above oxygen scavengers, oxygen scavengers disclosed in Japanese Patent Application Laid-Open No. 185653/2007 and Japanese Patent Application Laid-Open No. 104064/2005 utilize rare metals as starting metals that are rare and expensive. Further, the rare metals should be obtained through import from foreign countries, and, thus, depending upon further situation development, there is a possibility that the purchase of stock is varied, making it impossible to provide stable amount of production. Accordingly, these oxygen scavengers are not always satisfactory from the viewpoints of cost and stable supply of the rare metals. The oxygen scavenger disclosed in Japanese Patent Application Laid-Open No. 277148/1987 requires the provision of a large hydrogen reduction equipment in the production thereof and thus cannot be simply produced and, at the same time, cannot be said to have good handleability in the atmosphere. Furthermore, the oxygen scavenger utilizing autoxidization of the organic substance utilizes an oxidation reaction of the organic substance as the main agent, posing a problem of a by-product produced after oxygen absorption.

Accordingly, there is still a demand for an oxygen absorbing agent that can absorb oxygen in the atmosphere even in a moisture-free or substantially moisture-free atmosphere, is advantageous in stable availability of starting materials at low cost, is substantially free from the problem of the by-product, and is not necessary to provide a large apparatus for hydrogen reduction as an incidental equipment.

PRIOR ART DOCUMENTS

Patent documents

Patent document 1: Japanese Patent Application Laid-Open No. 185653/2007
Patent document 2: Japanese Patent Application Laid-Open No. 104064/2005
Patent document 3: Japanese Patent Application Laid-Open No. 277148/1987

SUMMARY OF THE INVENTION

Problems to be Solved by the Invention

The present inventors have found that a metal obtained by removing only aluminum with an aqueous sodium hydroxide solution from an alloy composed of aluminum and iron or an alloy composed of aluminum and nickel can absorb and remove oxygen in an atmosphere, even in a moisture-free or substantially moisture-free atmosphere, for example, in an atmosphere of 30% RH (25° C.) or less to the same level as achieved by conventional oxygen scavengers and, further, this metal can be produced in a simple and cost-effective manner without the necessity to use a large-scale apparatus as in hydrogen reduction and that the use of this metal as an oxygen scavenger can realize oxygen absorption even in a moisture-free or substantially moisture-free atmosphere.

The metal, however, has a very high oxygen absorbing activity and sometimes reacts with oxygen even in the atmospheric environment to generate heat. Thus, when the oxygen absorbing agent is used without heat generation, the oxygen absorbing agent should be used under a specific environment (for example, under an oxygen-free atmosphere). In this case, equipment and the like are necessary for providing the specific environment, leading to troublesome handling and, further, an increased handling cost.

The present inventors have now noticed that the oxygen absorbing activity can be regulated by treating the metal with a specific solution capable of forming a salt with the metal to form a metal salt at a part of the surface of the metal and have found that, according to this method, an oxygen absorbing agent can be produced which can suppress excessive heat generation under an atmospheric environment and can stably maintain an oxygen absorbing capability. The present invention has been made based on such finding.

Accordingly, an object of the present invention is to provide a process for producing an oxygen absorbing agent that can suppress excessive heat generation under an atmospheric environment and can stably maintain the oxygen absorbing capability.

Means for Solving the Problems

According to one aspect of the present invention, there is provided a process for producing an oxygen absorbing agent, the process comprising:

treating an alloy (X) with an aqueous solution of an acid or an alkali, the alloy (X) comprising (A) at least one transition metal selected from the group consisting of manganese, iron, platinum, and copper group metals and (B) at least one metal selected from the group consisting of aluminum, zinc, tin, lead, magnesium, and silicon to elute and remove at least a part of the component (B); and subjecting the alloy (Y) obtained by removing at least a part of the component (B) in the alloy (X) to treatment with an aqueous solution of a salt of an inorganic acid or a salt of an organic acid that can form a salt with the transition metal as the component (A), to form a metal salt in at least a part of the surface of the alloy (Y).

In an embodiment of the present invention, the component (A) is selected from iron, cobalt, nickel, and copper.

In an embodiment of the present invention, the component (B) is aluminum.

In an embodiment of the present invention, the removal of the component (B) by the elution is carried out until the content of the component (B) in the alloy (Y) reaches 0.01 to 50% by weight.

In an embodiment of the present invention, the aqueous solution of the acid or the alkali is an aqueous sodium hydroxide solution.

In an embodiment of the present invention, a powder of the alloy (X) comprising the component (A) and the component (B) is treated with the aqueous solution of the acid or the alkali to elute and remove at least a part of the component (B) and thus to obtain a powdery alloy (Y).

In an embodiment of the present invention, the salt of the inorganic acid or the salt of the organic acid is a salt of at least one of weak acids selected from inorganic acids and organic acids with a strong base.

In an embodiment of the present invention, the salt of the inorganic acid or the salt of the organic acid is at least one salt selected from salts of phosphoric acid, carbonic acid, and oxalic acid.

According to another aspect of the present invention, there is provided an oxygen absorbing agent obtained by the above process.

In an embodiment of the present invention, the alloy (Y) obtained by eluting and removing at least a part of the component (B) is porous.

In an embodiment of the present invention, the alloy (Y) obtained by eluting and removing at least a part of the component (B) has a specific surface area of at least $10 \text{ m}^2/\text{g}$ as measured by a BET method.

According to still another aspects of the present invention, there are provided an oxygen absorbing packaged body comprising the above oxygen absorbing agent and a packaging material, the whole or a part of which is formed of an air-permeable packaging material, the oxygen absorbing agent having been packaged into the packaging material and an oxygen absorbing resin composition comprising the above oxygen absorbing agent and a thermoplastic resin.

According to a further aspect of the present invention, there is provided an oxygen absorbing resin sheet or film comprising the above oxygen absorbing resin composition.

Effect of the Invention

The process for producing an oxygen absorbing agent according to the present invention can provide an oxygen absorbing agent that can suppress excessive heat generation under an atmospheric environment and can stably maintain an oxygen absorbing capability, the process comprising: eluting and removing at least a part of the component (B) in an alloy (X) to obtain an alloy (Y), the alloy (X) comprising (A) a specific transition metal and (B) a specific metal, and subjecting the alloy (Y) to treatment with an aqueous solution of a salt of an inorganic acid or a salt of an organic acid that can form a salt with the transition metal as the component (A), to form a metal salt in at least a part of the surface of the alloy (Y).

MODE FOR CARRYING OUT THE INVENTION

<Process for Producing Oxygen Absorbing Agent>

The process for producing an oxygen absorbing agent according to the present invention includes the steps of (1) eluting and removing at least a part of the component (B) in an alloy (X) to obtain an alloy (Y), the alloy (X) comprising (A) a specific transition metal and (B) a specific metal, and (2) subjecting the alloy (Y) to treatment with an aqueous solution of a salt of an inorganic acid or a salt of an organic acid that can form a salt with the transition metal as the component (A), to form a metal salt in at least a part of the surface of the alloy (Y). Each step of the process for producing an oxygen absorbing agent will be described. The term "oxygen absorbing agent" as used herein refers to an agent that can selectively absorb oxygen from an atmosphere around the agent.

<Component (A)>

The transition metal usable as the component (A) constituting the oxygen absorbing agent is selected from manganese group metals (manganese, technetium, and rhenium), iron group metals (iron, cobalt, and nickel), platinum group metals (ruthenium, rhodium, palladium, osmium, iridium, and platinum), and copper group metals (copper, silver, and gold). The transition metals may be used either solely or in a combination of two or more of them. For example, when iron and nickel are selected, an Fe—Ni alloy may be used as the component (A).

The component (A) is preferably manganese, iron, cobalt, nickel, or copper, more preferably iron, cobalt, nickel, or copper, still more preferably iron or nickel, particularly preferably iron. Among them, iron is preferred because of high safety and low cost.

<Component (B)>

The component (B) constituting the oxygen absorbing agent is selected from aluminum, zinc, tin, lead, magnesium, and silicon. They may be used either solely or in a combination of two or more of them. The component (B) is, among the metals exemplified as the component (B), preferably a metal selected from aluminum, zinc, magnesium, and silicon, more preferably aluminum, zinc, magnesium, or silicon, still more preferably aluminum. Among them, aluminum is preferred because of low cost.

In the preparation of the oxygen absorbing agent according to the present invention, an alloy (X) comprising the component (A) and the component (B) is prepared. Molybdenum, chromium, titanium, vanadium, tungsten and the like may be further added as additive metals to the alloy (X). The alloy (X) may further comprise additive components such as cyanic acids.

The alloy (X) comprising the component (A) and the component (B) may be prepared by a melting method. Regarding the composition ratio of the component (A) and the component (B), preferably, when the proportion of the component (A) is 20 to 80% by weight, the proportion of the component (B) is 20 to 80% by weight. More preferably, when the proportion of the component (A) is 30 to 70% by weight, the proportion of the component (B) is 30 to 70% by weight. More specifically, for example, when the component (A) and the component (B) are iron or nickel and aluminum, respectively, preferably, the proportion of iron or nickel is 30 to 55% by weight while the proportion of aluminum is 45 to 70% by weight.

The alloy (X) as such may be subjected to treatment with an acidic or alkaline aqueous solution. In general, the alloy is finely ground before the treatment with the acidic or alkaline aqueous solution. The term "alloy" as used herein refers to an alloy having a single composition that has a specific crystal structure, as well as an alloy mixture or a mixture of metals per se.

The alloy (X) may be finely ground by a method properly selected from commonly used metal crushing/grinding methods. An example of the finely grinding method is one in which the alloy is ground by a jaw crusher, a roll crusher, a hammer mill or the like, and, if necessary, fine grinding with a ball mill is further performed. Alternatively, a method may also be adopted in which a molten metal of the alloy is finely ground by rapid solidification such as atomization. When atomization is adopted, fine grinding in an inert gas such as an argon gas is preferred. The atomization may be performed by a method described, for example, in Japanese Patent Application Laid-Open No. 23597/1993.

The particle diameter of the alloy powder is preferably in the range of 5 to 200 μm. The particle size distribution is preferably as narrow as possible. Sieving (classification) with commercially available mesh sieves (for example, 200-mesh sieves) may be properly performed from the viewpoints of removing large particles and providing uniform particle size distribution. The atomization is likely to provide near spherical powder particles and, at the same time, to provide a narrow particle size distribution.

The alloy (X) or alloy (X) powder thus obtained is treated with an acidic or alkaline aqueous solution to elute and remove at least a part of the component (B). That is, a alloy (Y) obtained by eluting and removing at least a part of the component (B) from the alloy (X) is used as the oxygen absorbing agent in the present invention. The acidic or alkaline aqueous solution is not particularly limited as long as the acidic or alkaline aqueous solution is one that does not dissolve or hardly dissolves the component (A), but on the other hand, the component (B) is mainly dissolved therein, and one that dissolves both the components (A) and (B) with the dissolution speed of the component (B) being higher than that of the component (A). Examples of acids usable in the acidic aqueous solution include hydrochloric acid, sulfuric acid, and nitric acid. Examples of alkalis usable in the alkaline aqueous solution include sodium hydroxide, potassium hydroxide, calcium hydroxide, tetramethylammonium hydroxide (TMAH), $Na_2CO_3$, $K_2CO_3$, and ammonia. In the acidic or alkaline aqueous solution, a combination of two or more of the acids or a combination of two or more of the alkalis may if necessary be used.

In a preferred embodiment of the present invention, the acidic or alkaline aqueous solution is preferably an alkaline aqueous solution, more preferably an aqueous solution of sodium hydroxide. For example, when aluminum is used as the component (B), the use of an aqueous sodium hydroxide solution as the alkaline aqueous solution is advantageous in that the removal of excess sodium hydroxide by water washing and the removal of eluted aluminum are easy and, thus, the effect of reducing the necessary times of water washing can be expected.

In the treatment with the acidic or alkaline aqueous solution, for alloy powder, it is common practice to introduce the alloy powder little by little into an acidic or alkaline aqueous solution with stirring. Alternatively, a method may be adopted in which the alloy powder is previously placed in water and a concentrated acid or alkali is added dropwise to the water containing the alloy powder.

In the treatment with the acidic or alkaline aqueous solution, the concentration of the acidic or alkaline aqueous solution is, for example, 5 to 60% by weight. More specifically, when sodium hydroxide is used, the concentration is preferably 10 to 40% by weight.

In the treatment with the acidic or alkaline aqueous solution, the temperature of the aqueous solution is, for example, preferably approximately 20 to 120° C., more preferably 25 to 100° C.

The treatment time for the treatment of the alloy or alloy powder with the acidic or alkaline aqueous solution may vary depending, for example, upon the shape, state, and amount of the alloy used, the concentration of the acidic or alkaline aqueous solution, and the temperature of the treatment but is generally approximately 30 to 300 min. The amount of the component (B) eluted from the alloy may be regulated by regulating the treatment time.

In the present invention, at least a part of the component (B) is eluted and removed from the alloy (X) by the treatment with the acidic or alkaline aqueous solution. Here eluting and removing "at least a part of the component (B)" means the elution and removal of a part of the component (B) from the alloy (X) comprising the component (A) and the component (B), as well as the elution and removal of the whole component (B) from the alloy (X) comprising the component (A) and the component (B). Thus, in the present invention, the "alloy (Y)" is a concept including a metal obtained by eluting the whole of the component (B) (that is, a metal consisting of the component (A) alone). It cannot be denied that there is possibility that, in the process of eluting the component (B), a part of the component (A) is dissolved in the acidic or alkaline aqueous solution. Accordingly, "at least a part of the component (B)" is not limited to the elution of only the component (B) by the treatment with the acidic or alkaline aqueous solution.

At least a part, preferably a large proportion, of the component (B) (for example, aluminum) is eluted from the alloy (X) by the treatment with the acidic or alkaline aqueous solution. The proportion of the elution of the component (B) from the alloy (X) can be expressed in terms of the content (on a weight basis) (residual ratio) of the component (B) in the alloy (Y) obtained after the elution and removal.

The content of the component (B) in the metal used as the oxygen absorbing agent (that is, the alloy (Y) after the elution of the component (B)) is preferably 0.01 to 50% by weight, more preferably 0.1 to 40% by weight. More specifically, for example, when the alloy (X) is an Al—Fe alloy, the content of aluminum in the alloy (Y) obtained by eluting and removing aluminum by the treatment with the acidic or alkaline aqueous solution from the alloy is preferably 0.01 to 50% by weight, more preferably 0.1 to 40% by weight, still more preferably 1 to 5% by weight. The content of the component (B) (for example, aluminum) in the alloy (Y) used in the oxygen absorbing agent may be measured, for example, by an ICP method.

Next, the alloy (Y) obtained by eluting and removing at least a part of the component (B) is treated with an aqueous solution of a salt of an inorganic or organic acid that can form a salt with a transition metal as the component (A) to form a metal salt in at least a part of the surface of the metal. The alloy (Y) after the elution of at least a part of the metal as the component (B) has a very high oxygen absorbing activity and sometimes react with oxygen even in the atmospheric environment to cause heat generation. As described above, the treatment of the surface of the alloy (Y) after the elution of the metal as the component (B) with a specific aqueous solution can form a metal salt in at least a part of the surface of the alloy (Y) to suppress heat generation derived from a reaction with oxygen, whereby the oxygen absorbing capability can be regulated. The reason why the heat generation derived from the reaction with oxygen can be suppressed by the formation of a metal salt on the surface of the alloy (Y) has not been elucidated yet but is believed to be as follows.

A film of a metal salt is formed on the surface of the alloy (Y) by treating the alloy (Y) with an aqueous solution of a salt of an inorganic or organic acid. It is considered that this film inhibits the diffusion of oxygen in pores in the alloy (Y) to avoid a rapid oxidation reaction, contributing to the suppression of heat generation.

An aqueous salt solution of at least one of weak acids selected from inorganic acids and organic acids with a strong base may be mentioned as the aqueous solution of the salt of the inorganic or organic acid that can form a salt with a transition metal. Phosphoric acid, carbonic acid and the like may be mentioned as the inorganic acid, and oxalic acid and the like may be mentioned as the organic acid. Strong bases that react with these weak acids to form salts of organic or inorganic acids include, but are not particularly limited to, sodium hydroxide and potassium hydroxide.

Among the salts of the inorganic or organic acids, salts of phosphoric acid, carbonic acid, and oxalic acid are preferred. Examples thereof include sodium hydrogen phosphate, sodium dihydrogen phosphate, sodium hydrogen carbonate, and sodium oxalate.

For example, when the metal obtained by eluting and removing aluminum as the component (B) from the Al—Fe alloy as the alloy is treated with the aqueous solution of the salt of the inorganic or organic acid, a metal salt is formed on the surface of the metal (that is, Fe) to form a film of a salt such as iron(II) phosphate octahydrate, iron(III) phosphate dihydrate, iron(II) carbonate, iron(II) carbonate monohydrate, iron(II) oxalate dihydrate, or iron(III) oxalate pentahydrate. When the metal obtained by eluting and removing aluminum as the component (B) from the Al—Ni alloy is treated with the aqueous solution of the salt of the inorganic or organic acid, a metal salt is formed on the surface of the metal (that is, Ni) to form a film of a salt such as nickel(II) phosphate octahydrate, nickel(II) carbonate, or nickel(II) oxalate dihydrate. These salts also react with oxygen but have a lower oxidizing activity than iron and nickel. Consequently, excessive heat generation of the oxygen absorbing agent under the atmospheric environment can be suppressed and the oxygen absorbing capability can be stably maintained.

The treatment of the alloy (Y) obtained by eluting and removing the metal as the component (B) with the aqueous solution of the salt of the inorganic or organic acid may follow the drying of the metal after the elution and removal treatment, or alternatively may follow the elution and removal treatment without the drying.

The concentration of the aqueous solution of the salt of the inorganic or organic acid may vary depending upon the amount of the metal to be surface-treated but is preferably not less than 0.1 M or not more than the saturated concentration. The saturated concentration means the concentration of a solute at which the amount of the solute dissolvable in a given amount of water under certain temperature conditions is maximum. When the concentration of the aqueous salt solution is excessively low, the metal salt cannot be sometimes formed on the surface of the alloy.

Whether or not the metal salt film is formed can be confirmed, for example, by X-ray diffractometry or electron microscopic observation.

The oxygen absorbing agent thus obtained can allow excessive heat generation to be suppressed under the atmospheric environment and can stably maintain the oxygen absorbing capability. When the oxygen absorbing agent is taken out in air, the surface temperature of the oxygen absorbing agent may vary depending upon contemplated applications of the oxygen absorbing agent but is preferably 250° C. or below, more preferably 200° C. or below, still more preferably 150° C. or below, particularly preferably 100° C. or below. For example, when the oxygen absorbing agent is taken out in air from under an oxygen-free environment and is kneaded with a thermoplastic resin or the like before use, the lower the surface temperature of the oxygen absorbing agent, the lower the heat resistance of the thermoplastic resin kneadable with the oxygen absorbing agent.

The alloy (Y) thus obtained has a porous form or is a porous body. Here the porous shape refers to such a state that a number of pores that are observable under an electron microscope are present on the surface or in the inside of the alloy. In the present invention, the level of the porosity in the porous shape of the alloy (Y) can be expressed in terms of the specific surface area. Specifically, the specific surface area of the alloy (Y) used in the oxygen absorbing agent according to the present invention as measured by a BET method is at least 10 $m^2/g$, preferably at least 20 $m^2/g$, more preferably at least 40 $m^2/g$.

For example, in the present invention, when iron and aluminum are used as the component (A) and the component (B), respectively, the specific surface area (measured by the BET method) of the resultant porous alloy (Y) is approximately 20 to 40 $m^2/g$, whereas a nonporous conventional iron powder (reduced iron powder or atomized iron powder) has a specific surface area of approximately 0.07 to 0.13 $m^2/g$, demonstrating that the former is porous.

The porosity in the porous shape of the alloy (Y) may also be expressed in terms of bulk density. The bulk density of the alloy (Y) used in the oxygen absorbing agent according to the present invention is not more than 2 $g/cm^3$, preferably not more than 1.5 $g/cm^3$. Incidentally, the nonporous conventional iron powder (reduced iron powder or atomized iron powder) has a bulk density of approximately 2 to 3 $g/cm^3$.

In the present invention, the porous alloy (Y) used in the oxygen absorbing agent has a high level of oxygen absorption activity and thus may also be of course suitable for use as an oxygen absorbing agent even under an atmosphere having a low humidity (for example, 30% RH or less (relative humidity) (25° C.)). It is needless to say that the porous metal is also suitable as oxygen absorbing agents even under high-humidity conditions (for example, under 100% RH (relative humidity) (25° C.) conditions).

Accordingly, the alloy (Y) obtained as described above can absorb at least 5 mL/g of oxygen, more preferably 10 mL/g of oxygen under an atmosphere having a low humidity of 30% RH or less (relative humidity) (25° C.). When the alloy (Y) is used as the oxygen absorbing agent, the amount of oxygen absorbed is 5 to 150 mL/g under an atmosphere having a low humidity of 30% RH or less (relative humidity) (25° C.).

<Use of Oxygen Absorbing Agent>

As described above, the porous metal used in the oxygen absorbing agent is likely to be oxidized and deteriorated in the atmosphere, and, thus, this metal may be used in the form of an oxygen absorbing resin obtained by mixing (kneading) this metal with a thermoplastic resin. The oxygen absorbing resin after kneading may also be extruded and stretched to form a film or a sheet and to thus obtain an oxygen-absorbable film or sheet.

The type of thermoplastic resins used is not particularly limited, and examples thereof include polyethylene, polypropylene, ethylene-vinyl acetate copolymers, elastomers, or mixtures thereof.

The oxygen absorbing agent may be formed into an oxygen absorbing agent packaged body comprising: the oxygen absorbing agent; and a packaging material, the whole or a part of which is formed of an air-permeable packaging material, the oxygen absorbing agent having been packaged into the packaging material. Examples of such packaging materials include a packaging material prepared by laminating two air-permeable packaging materials and forming a bag from the laminate, a packaging material prepared by laminating one air-permeable packaging material and one air-impermeable packaging material and forming a bag from the laminate, and a packaging material prepared by folding one air-permeable packaging material and mutually sealing edges except for the folded part to form a bag. Packaging materials permeable to oxygen and carbon dioxide are usable as the air-permeable packaging material. Examples of such air-permeable packaging materials include papers, nonwoven fabrics, and conventional plastic films that have been treated to render them permeable to air.

The oxygen absorbing agent according to the present invention can absorb oxygen regardless of water activity and can be applied to a region having high water activity to a region having a low water activity. Further, the oxygen absorbing agent according to the present invention is suitable for commodities that have low water activity and should be stored under low-humidity drying conditions. The water activity refers to a measure of the content of free water in commodities and is expressed by a numeral value of 0 to 1 wherein the water activity of water-free commodities is 0 (zero) and the water activity of pure water is 1. That is, the water activity is defined as follows.

$$Aw = P/P_0 = RH/100$$

wherein Aw represents the water activity of a commodity; P represents a water vapor pressure within a space after the commodity is hermetically sealed and is brought to an equilibrium state; $P_0$ represents a water vapor pressure of pure water; and RH represents a relative humidity within the space, %.

In order to store commodities having a low water content that should be stored under low-humidity conditions, the relative humidity (RH) of an atmosphere in which the commodities having a low water content are stored is preferably 20 to 70%, more preferably 20 to 50%. The water content of commodities having a low water content is preferably not more than 50% by weight, more preferably not more than 30% by weight, particularly preferably not more than 10% by weight. Commodities having a low water content (products to be packaged) that should be stored under low-humidity conditions include, for example, foods and pharmaceutical products that are weak against an increase in water content and are required to avoid inclusion of foreign materials, for example, powdery and granular foods (powder soups, powder beverages, powder confectioneries, seasoners, grain powders, nutritional foods, health foods, artificial colors, flavoring agents, and spices and condiments), powdery and granular pharmaceutical products (medicinal powders, powdered soaps, toothpastes, and heavy chemicals), and molded products (tablets) thereof. In particular, when the products to be packaged are filled into oxygen absorbing packaging bodies which will be described later, oxygen in an atmosphere, even in a moisture-free or substantially moisture-free atmosphere, can be absorbed and removed on the same level as that attained by conventional oxygen scavengers. Accordingly, the oxygen absorbing agent is suitable for use in applications where an atmosphere in packages of dried foods, pharmaceutical products, and electronic materials, which are weak against moisture and for which conventional oxygen scavengers cannot be applied, is brought to an oxygen-free state. The oxygen absorbing agent is suitable for use, for example, in dried foods such as powder seasoners, powder coffees, coffee beans, rices, teas, beans, baked rice chips, and rice crackers, pharmaceutical products and health foods such as vitamin preparations.

EXAMPLES

The present invention is further illustrated by the following Examples. However, the present invention is by no means to be construed as being limited to them.

Example 1

An Al (aluminum) powder (50% by weight) and a Ni (nickel) powder (50% by weight) were mixed together and were dissolved in each other in nitrogen to obtain an Al—Ni alloy. The Al—Ni alloy thus obtained was ground with a jaw crusher, a roll crusher, and a ball mill, and the ground product was classified with a net having an opening of 200 meshes (0.075 mm) to obtain an Al—Ni alloy having a particle size of not more than 200 meshes. The Al—Ni alloy powder (100 g) thus obtained was mixed while stirring for one hr in a 25% (by weight) aqueous sodium hydroxide solution of 90° C. The mixed solution was allowed to stand, and the upper layer liquid was removed. The residual precipitate was washed with distilled water until pH became 10 or less to obtain a porous Al—Ni alloy powder. In order to avoid contact with oxygen, the porous alloy powder was obtained by a reaction in an aqueous solution.

The porous Al—Ni alloy powder thus obtained was dried in vacuo under conditions of not more than 200 Pa and 60° C. for 2 hr to obtain a dried product of a porous Al—Ni alloy powder. The alloy powder had a bulk density of 1.4 g/cm³ (as measured according to JIS (Japanese Industrial Standards) Z 2504). The porous alloy powder (0.3 g) was packaged in an air-permeable small bag and, together with a desiccant, was placed in a gas barrier bag (an Al foil-laminated plastic bag). The gas barrier bag was filled with 500 mL of air (oxygen concentration: 20.9% by volume), was hermetically sealed, and was stored at 25° C. for one day. The concentration of oxygen within the gas barrier bag after the storage was 15.0%. The amount of oxygen absorbed was calculated from the reduced oxygen concentration in the gas barrier bag and was found to be 115.7 mL/g.

The mean particle diameter of the porous Al—Ni alloy powder was measured with a particle size/shape distribution measuring device ("PITA-2," manufactured by Seishin Enterprise Co., Ltd.) and was found to be about 30 μm. The specific surface area of the porous Al—Ni alloy powder was measured with an automatic specific surface area measuring device ("GEMINI VII2390", manufactured by Shimadzu Seisakusho Ltd.) and was found to be 90 $m^2/g$.

Subsequently, a 0.5 M aqueous solution (61 mL) of disodium hydrogen phosphate and a 0.5 M aqueous solution (39 mL) of sodium dihydrogen phosphate were mixed together to prepare a 0.5 M aqueous acid salt solution. The porous Al—Ni alloy powder (2.8 g) that had been dried in vacuo (at 80° C. for 2 hr) was immersed in the aqueous acid salt solution, and, 5 hr after the start of the immersion, the oxygen absorbing agent was taken out from the buffer solution with a spatula and was dried in vacuo under conditions of 200 Pa and 60° C. for 2 hr. Thereafter, for the porous Al—Ni alloy powder obtained by immersion in the phosphate buffer solution, the amount of oxygen absorbed was calculated as described above.

In a nitrogen atmosphere, the porous Al—Ni alloy powder (1 g) obtained by immersion in the phosphate buffer solution was wrapped in a glass filter, was placed in a gas barrier bag (an Al foil-laminated plastic bag), and was then taken out in air. A thermocouple was placed on the glass filter with the alloy powder placed therein, and a change in temperature of the alloy powder was measured with a temperature data logger. The results were as shown in Table 1 below.

Example 2

An Al (aluminum) powder (50% by weight) and an Fe (iron) powder (50% by weight) were mixed together and were dissolved in each other in nitrogen to obtain an Al—Fe alloy. The Al—Fe alloy thus obtained was ground with a jaw crusher, a roll crusher, and a ball mill, and the ground product was classified with a net having an opening of 200 meshes (0.075 mm) to obtain an Al—Fe alloy having a particle size of not more than 200 meshes. The Al—Fe alloy powder (100 g) thus obtained was mixed while stirring for one hr in a 25% (by weight) aqueous sodium hydroxide solution of 50° C. The mixed solution was allowed to stand, and the upper layer liquid was removed. The residual precipitate was washed with distilled water until pH became 10 or less to obtain a porous Al—Fe alloy powder. In order to avoid contact with oxygen, the porous alloy powder was obtained by a reaction in an aqueous solution.

The porous Al—Fe alloy powder thus obtained was dried in vacuo under conditions of not more than 200 Pa and 50° C. to a water content of not more than 1% by weight to obtain a dried product of a porous Al—Fe alloy powder. The porous Al—Fe alloy powder had a bulk density of 1.4 $g/cm^3$ (as measured according to JIS Z 2504). For the porous Al—Fe alloy powder, the amount of oxygen absorbed, the mean particle diameter, and the specific surface area of the porous Al—Fe alloy powder were measured in the same manner as in Example 1 and were found to be 21.0 mL/g, about 30 μm, and 24.0 $m^2/g$, respectively.

In the same manner as in Example 1, the aqueous acid salt solution treatment and the measurement of the amount of oxygen absorbed and the change in temperature were carried out except that 20 mL of a 2 M aqueous sodium carbonate solution was used instead of the aqueous acid salt solution used in Example 1 and the immersion time was changed to 0.5 hr. The results were as shown in Table 1 below.

Comparative Example 1

In the same manner as in Example 1, the amount of oxygen absorbed and the change in temperature were measured except that the aqueous acid salt solution treatment was not carried out. The results were as shown in Table 1 below.

Comparative Example 2

In the same manner as in Example 2, the amount of oxygen absorbed and the change in temperature were measured except that the aqueous acid salt solution treatment was not carried out. The results were as shown in Table 1 below.

TABLE 1

| | Max. temp. (° C.) | Amount of oxygen absorbed (mL/g) |
|---|---|---|
| Example 1 | 24.4 | 53.0 |
| Example 2 | 165.8 | 56.0 |
| Comparative Example 1 | 295.5 | 115.7 |
| Comparative Example 2 | 312.3 | 61.9 |

The invention claimed is:

1. A process for producing an oxygen absorbing agent, the process comprising:
   treating an alloy (X) with an aqueous solution of an acid or an alkali, the alloy (X) comprising (A) at least one transition metal selected from the group consisting of manganese, iron, platinum, and copper group metals and (B) at least one metal selected from the group consisting of aluminum, zinc, tin, lead, magnesium, and silicon to elute and remove at least a part of the component (B); and
   subjecting a material (Y) obtained by removing at least a part of the component (B) in the alloy (X) to treatment with an aqueous solution of a salt of an inorganic acid or a salt of an organic acid that can form a salt with the transition metal as the component (A), to form a metal salt of the at least one transition metal in at least a part of the surface of the material (Y).

2. The process according to claim 1, wherein the component (A) is selected from iron, cobalt, nickel, and copper.

3. The process according to claim 1, wherein the component (B) is aluminum.

4. The process according to claim 1, wherein the removal of the component (B) by the elution is carried out until the content of the component (B) in the material (Y) reaches 0.01 to 50% by weight.

5. The process according to claim 1, wherein the aqueous solution of the acid or the alkali is an aqueous sodium hydroxide solution.

6. The process according to claim 1, wherein the alloy (X) comprises a powder of the alloy (X), and which comprises treating the powder of the alloy (X) comprising the component (A) and the component (B) with the aqueous solution of the acid or the alkali to elute and remove at least a part of the component (B) and thus to obtain a powdery material (Y).

7. The process according to claim 1, wherein the salt of the inorganic acid or the salt of the organic acid is a salt of at least one of weak acids selected from inorganic acids and organic acids with a strong base.

8. The process according to claim 1, wherein the salt of the inorganic acid or the salt of the organic acid is at least one salt selected from salts of phosphoric acid, carbonic acid, and oxalic acid.

* * * * *